(No Model.)
J. WHITE.
DEVICE FOR HOLDING MILK TICKETS.
No. 476,343. Patented June 7, 1892.
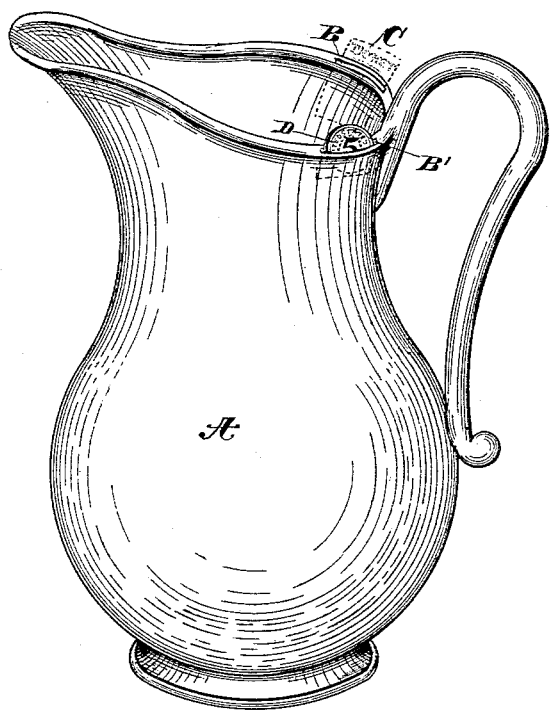
WITNESSES:
E. T. Walker
H. H. Wood
INVENTOR.
James White
by F. W. Ritter Jr
his Attorney

UNITED STATES PATENT OFFICE.

JAMES WHITE, OF CHICAGO, ILLINOIS.

DEVICE FOR HOLDING MILK-TICKETS.

SPECIFICATION forming part of Letters Patent No. 476,343, dated June 7, 1892.

Application filed February 18, 1890. Serial No. 340,878. (No model.)

*To all whom it may concern:*

Be it known that I, JAMES WHITE, a citizen of the United States, residing at Chicago, in the county of Cook and State of Illinois, have invented certain new and useful Improvements in Devices for Holding Milk-Tickets; and I do hereby declare the following to be a full, clear, and exact description of the invention, such as will enable others skilled in the art to which it appertains to make and use the same.

My invention relates to ticket or money holders formed in milk-pitchers or other vessels of pottery or other frangible material.

As is well known, the usual manner of delivering milk to the private consumer is from the milk-wagon, which is driven to the door of the consumer. The consumer, for convenience, usually leaves the pitcher over night at a place where it can be conveniently reached by the driver on his early rounds before any of the family arise. With the pitcher or other vessel is usually left a milkman's ticket, previously sold by the quantity to the consumer, which calls for a certain quantity of milk, and in some cases the cost of the milk in money is left. Often the ticket or money is put inside the pitcher. If in such cases the vessel should from any cause be left wet or moist, or become wet or moist on the inside during the night, the ticket is liable to adhere to the bottom or side of the vessel, and in wintry weather the ticket or money is frozen to the vessel. Frequently the driver carelessly pours the milk into the vessel without first removing the ticket or money, which necessitates pouring the milk back into the measure before the ticket or money can be reached.

The object of my invention is to overcome these objections; and to this end it consists in forming a slit or pocket in the rim of a vessel made of pottery or other frangible material adjacent to the handle thereof in such a manner that the vessel will not be weakened thereby, and so as not to detract from the appearance of the vessel.

In order that my invention may be more clearly understood, I have illustrated it in the accompanying drawing as applied to a pitcher.

In the drawing, A represents a pitcher formed of pottery or other frangible material, in the rim of which and adjacent to the handle are formed two slits or pockets B B', the slit or pocket B of which is of a shape preferably oblong to conform to the shape of the ticket C, which is usually oblong, and is of sufficient depth to retain the ticket therein until removed by the milkman. The pocket B', I have shown of less depth than the pocket B, in order that a coin D may be held therein in position to be readily grasped by the fingers of the milkman, and, if preferred, the bottom of said pocket may be semicircular or concave; but this is not essential.

It will be seen that by forming the pockets in the frangible rim, as shown, they do not in the least detract from the appearance of the vessel, the vessel can be made as neat in appearance as if the pockets were omitted, and the ticket or money can be securely held therein until removed by the milkman, and by locating the pockets in the rim adjacent to the handle there is less danger of the pockets being struck and chipped or broken, as the rim at this point is reinforced by the handle.

While I have shown my invention as applied to pitchers, I do not wish to be limited thereto, as the same may be formed in any other class of vessel formed of pottery or other frangible material without departing from the principle of my invention.

Having described my invention, what I claim, and desire to secure by Letters Patent, is—

A vessel of pottery or other frangible material having a handle and provided with a slit or pocket in the rim thereof adjacent to the handle, substantially as and for the purposes described.

In testimony whereof I affix my signature in the presence of two witnesses.

JAMES WHITE.

Witnesses:
 A. ROSSITER,
 W. G. RAINEY.